US008857883B2

(12) United States Patent
Kargilis et al.

(10) Patent No.: US 8,857,883 B2
(45) Date of Patent: Oct. 14, 2014

(54) ELECTRICAL CIRCUIT WITH PASSIVE WIRING CONNECTOR FOR ELECTRICAL DEVICE MOUNTED ON VEHICLE WINDOW

(71) Applicants: John S Kargilis, Northville, MI (US); Hugh W Ireland, Flint, MI (US); David A Bustamante, Dearborn, MI (US)

(72) Inventors: John S Kargilis, Northville, MI (US); Hugh W Ireland, Flint, MI (US); David A Bustamante, Dearborn, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/647,915

(22) Filed: Oct. 9, 2012

(65) Prior Publication Data

US 2014/0099840 A1    Apr. 10, 2014

(51) Int. Cl.
*H01R 4/48* (2006.01)

(52) U.S. Cl.
USPC .......................... 296/56; 296/146.9; 439/700

(58) Field of Classification Search
USPC ........... 296/50, 56, 57.1, 146.5, 146.8, 146.9, 296/146.15, 146.16; 439/799, 824, 700
See application file for complete search history.

(56) References Cited

U.S. PATENT DOCUMENTS

| 4,707,591 | A | 11/1987 | Sprenger |
| 4,997,396 | A | 3/1991 | Gold et al. |
| 5,229,560 | A | 7/1993 | Demarco |
| 6,638,075 | B2 | 10/2003 | Spaulding et al. |
| 6,712,420 | B1 * | 3/2004 | Kargilis et al. .......... 296/146.15 |
| 6,805,393 | B1 * | 10/2004 | Stevenson et al. .............. 296/50 |
| 7,144,065 | B2 | 12/2006 | McClure et al. |
| 7,322,861 | B2 * | 1/2008 | Pavlovic ....................... 439/700 |
| 7,748,765 | B2 | 7/2010 | Byrnes et al. |
| 7,871,272 | B2 | 1/2011 | Firman, II et al. |
| 2005/0118744 | A1 | 6/2005 | Ishiguro et al. |

FOREIGN PATENT DOCUMENTS

| DE | 3023513 A1 | 1/1982 |
| FR | 2649650 A1 | 1/1991 |

OTHER PUBLICATIONS

Smittybilt, www.smittybilt.com/product/index/88.htm, retreived on Oct. 9, 2013 from the Internet Archive Wayback Machine at http://web.archive.org/web/20110712235758/http://www.smittybilt.com/product/index/88.htm, as existed on Jul. 12, 2011.*
International Search Report and Written Opinion dated Jan. 8, 2014 for International Application No. PCT/US2013/060786, International Filing Date Sep. 20, 2013.

* cited by examiner

*Primary Examiner* — Glenn Dayoan
*Assistant Examiner* — Jason S Daniels
(74) *Attorney, Agent, or Firm* — Ralph E Smith

(57) ABSTRACT

A vehicle includes a vehicle body that supports an electrical line that is electrically connected to a power source and that terminates at a first terminal. The vehicle also includes a window member with an electrical device supported thereon. A second terminal of the electrical device is supported on the window assembly, and the window member is moveable relative to the vehicle body. The vehicle further includes a passive electrical connector with a plunger that moves between a retracted position and an extended position. The passive electrical connector also includes a biasing member that biases the plunger toward the extended position. The passive electrical connector electrically connects the first and second terminals when the window member is in a first position. The plunger is biased toward the extended position when the window member is in the second position to electrically disconnect the first and second terminals.

17 Claims, 2 Drawing Sheets

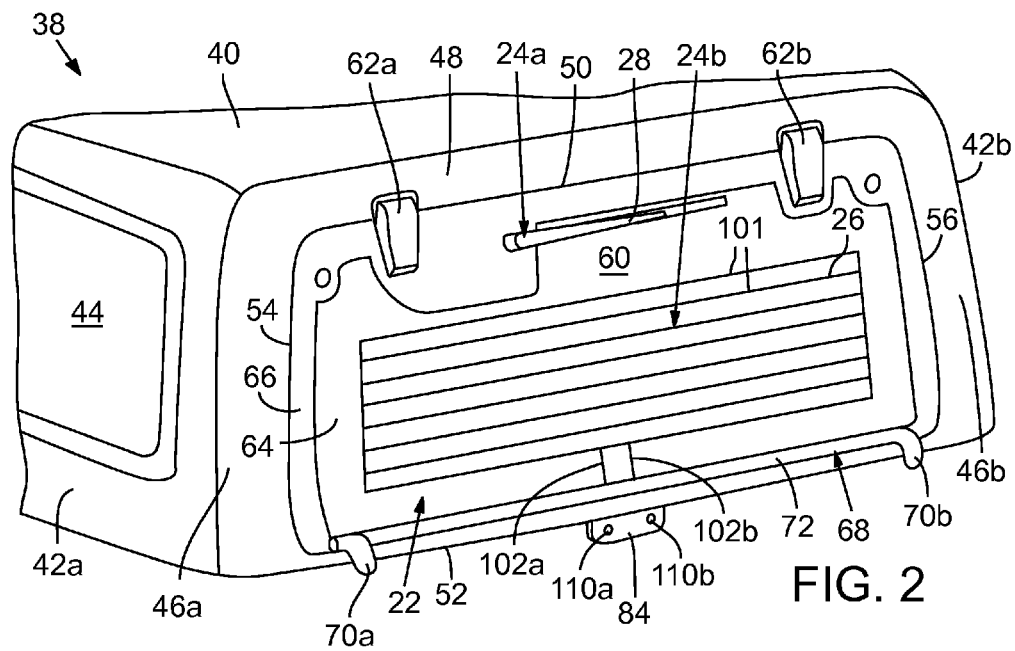
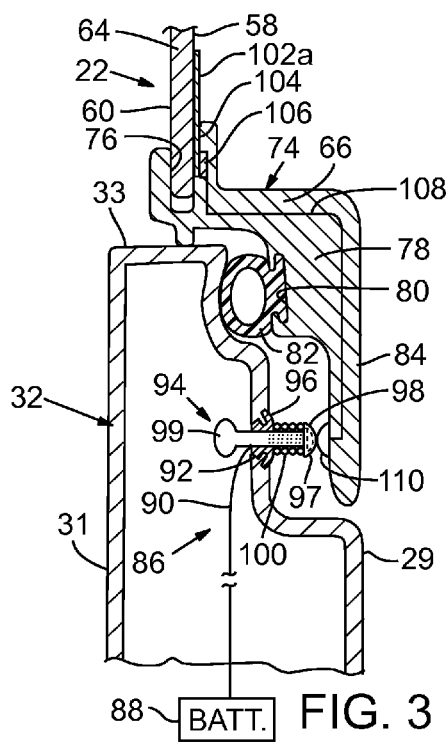
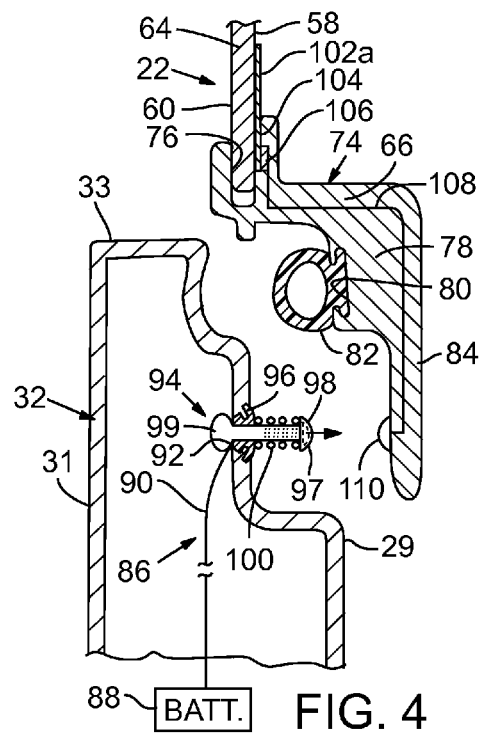

ELECTRICAL CIRCUIT WITH PASSIVE WIRING CONNECTOR FOR ELECTRICAL DEVICE MOUNTED ON VEHICLE WINDOW

FIELD

The present disclosure relates to a vehicle and, more particularly, relates to an electrical circuit with a passive wiring connector for an electrical device mounted on vehicle glass.

BACKGROUND

Vehicles often include one or more windows made from panes of glass or other transparent material. For instance, cars, vans, trucks, sports utility vehicles (SUVs), or other types of vehicles typically a windshield, one or more side windows, and a back window. As such, vehicle occupants can look out through the window(s) to view objects outside the vehicle.

In some cases, one or more electrical devices can be mounted on a vehicle window. For instance, the rear window can include a defogger (i.e., rear defroster). The defogger can include one or more resistive wires that are mounted on the window. When energized, the wires can heat up to reduce condensation on the window, thereby allowing the occupant to see more easily through the rear window. Also, some vehicles can include a motorized wiper that is mounted to the vehicle window. Moreover, vehicle windows can include a light bulb or other electrical device mounted thereto.

SUMMARY

A vehicle is disclosed that includes a vehicle body that at least partially defines an interior area of the vehicle. The vehicle body operably supports an electrical line that is electrically connected to a power source and that terminates at a first terminal. The vehicle also includes a window member with an electrical device supported thereon. A second terminal of the electrical device is supported on the window assembly, and the window member is moveable relative to the vehicle body to move between a first position, in which the second terminal is adjacent the first terminal, and a second position, in which the second terminal is spaced away from the first terminal. The vehicle further includes a passive electrical connector with a plunger that is moveably mounted to one of the vehicle body and the window member to move between a retracted position and an extended position. The passive electrical connector also includes a biasing member that biases the plunger toward the extended position. The passive electrical connector electrically connects the first and second terminals when the window member is in the first position. The plunger is biased toward the extended position when the window member is in the second position to electrically disconnect the first and second terminals.

Moreover, a vehicle is disclosed that includes a vehicle body. The vehicle body at least partially defines an interior area of the vehicle, and the vehicle body operably supports an electrical line that is electrically connected to a power source and that terminates at a first terminal. The vehicle also includes a rear window member with a transparent pane and a framing member. The rear window member is moveable relative to the vehicle body to move between a first position and a second position. Moreover, the vehicle includes a defogger that is operably mounted to the rear window member. The defogger includes an electrical line that extends across the transparent pane and the framing member and that terminates at a second terminal. The second terminal is adjacent the first terminal when the window member is in the first position, and the second terminal is spaced away from the first terminal when the window member is in the second position. Additionally, the vehicle includes a passive electrical connector with a plunger that is moveably mounted to one of the vehicle body and the window member to move between a retracted position and an extended position. The passive electrical connector also includes a biasing member that biases the plunger toward the extended position. The passive electrical connector electrically connects the first and second terminals when the window member is in the first position. The plunger is biased toward the extended position when the window member is in the second position to electrically disconnect the first and second terminals.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a rear, perspective view of a cap member of the vehicle of FIG. 1;

FIG. 3 is a section view of the vehicle taken along the line 3-3 of FIG. 1, wherein the window member and/or a rear gate is shown in a closed position; and FIG. 4 is a section view of the vehicle similar to FIG. 3, wherein the window member and/or the rear gate is shown in an open position.

DETAILED DESCRIPTION

Figure 1:
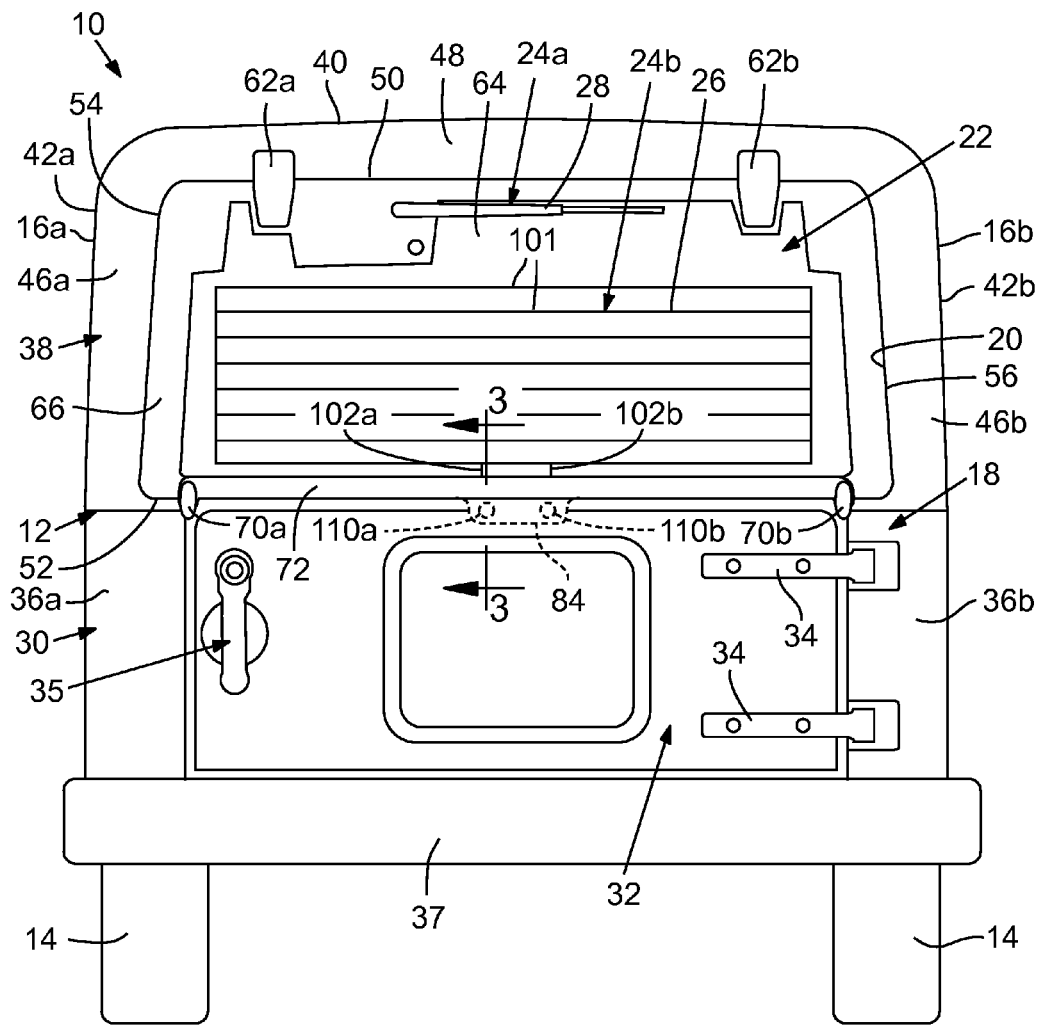
FIG. 1 is a rear view of a vehicle with a window member and an electrical device mounted thereto according to exemplary embodiments of the present disclosure.

Referring initially to FIG. 1, a vehicle 10 is illustrated according to exemplary embodiments of the present disclosure. The vehicle 10 can be a car, truck, van, sports utility vehicle (SUV), or any other type of vehicle 10. The vehicle 10 can generally include a vehicle body 12 that is supported on a plurality of tires 14. The vehicle body 12 can include plural side walls 16a, 16b, specifically, a driver side wall 16a and a passenger side wall 16b. Moreover, the vehicle body 12 can include a rear wall 18. The vehicle body 12 can further include a front end, which is not specifically shown, but that is opposite the rear wall 18. The vehicle body 12 can additionally include a roof 40 that extends horizontally between the rear wall 18, the side walls 16a, 16b, and the front end (not shown).

The rear wall 18 includes a generally rectangular opening 20. The rear wall 18 can also include a rear gate 32 and a window member 22 that cooperatively cover the opening 20. As will be discussed, the rear gate 32 can be moveably coupled (e.g., pivotally attached) to surrounding structures of the vehicle body 12, and the window member 22 can also be moveably coupled (e.g., pivotally attached) to surrounding structures of the vehicle body 12. Thus, both the rear gate 32 and the window member 22 can be selectively and independently moved between a respective closed position (see FIG.

1) to cover and close the opening 20 and an open position (see FIG. 4) as will be discussed in greater detail below.

In the embodiments illustrated, the side walls 16a, 16b and rear wall 18 extend substantially vertically (i.e., substantially normal to the road, etc.). However, the walls 16a, 16b, 18 could be more curved than the illustrated embodiments and can extend at any angle relative to the road. Also, it will be appreciated that the rear wall 18 could be configured to include a hatchback, a flip-down gate 32, a swinging gate 32, a flip-up window member 22, a stationary window member 22 (i.e., a window member 22 that is fixed relative to surrounding structures of the vehicle body 12), or could be configured in any suitable fashion without departing from the scope of the present disclosure.

The vehicle 10 can also include at least one electrical device 24a, 24b that is supported by the window member 22. For instance, in the embodiments illustrated, the vehicle 10 includes a defogger 26 and a rear window wiper 28 on the window member 22. However, it will be appreciated that the vehicle 10 could include any other type of electrical device 24a, 24b without departing from the scope of the present disclosure.

The defogger 26 can include a grid of resistive electrical wires that are mounted to (e.g., silkscreened onto) the window member 22 and when power is supplied to the defogger 26, the defogger 26 can reduce condensation or frost that is built up on the window member 22. The rear window wiper 28 can include a wiper blade and an electric motor that drives the blade to wipe away moisture from the external surface of the window member 22.

As will be discussed in detail, power can be supplied to the electrical device(s) 24a, 24b via a wiring system 86 (FIGS. 3 and 4) that extends through the vehicle body 12. Also, the wiring system 86 can include one or more passive electrical connectors 94 (FIGS. 3 and 4) that passively and automatically disconnect (i.e., open circuit configuration) when the rear gate 32 and/or the window member 22 moves from the respective closed position (FIG. 3) to the respective open position (FIG. 4). Also, the passive electrical connector(s) 94 can passively and automatically connect (i.e., closed circuit configuration) when the rear gate 32 and/or the window member 22 moves from the respective open position (FIG. 4) to the respective closed position (FIG. 3). Accordingly, the electrical connector(s) 94 can ensure that the electrical devices 24a, 24b operate as intended and can conveniently establish electrical connection(s) within the wiring system 86.

Referring now to FIGS. 1 and 2, the vehicle body 12 will now be discussed in greater detail. The vehicle body 12 can be assembled from a plurality of rigid beams that are assembled into a vehicle frame, a plurality of rigid panels that are attached to the frame to define external surfaces of the vehicle 10, etc. As shown, the vehicle body 12 can be divided into a lower body portion 30 (shown in FIG. 1) and an upper cap portion 38 (shown supported atop the lower body portion 30 in FIG. 1 and shown standing alone in FIG. 2). The lower body portion 30 and upper cap portion 38 can cooperate to define a passenger compartment, a cargo area, or other internal area of the vehicle 10. The cap portion 38 can be removably attached to the lower body portion 30 via a known latching system, etc. Also, in some embodiments, the upper cap portion 38 could fixedly attached to the lower body portion 30 without departing from the scope of the present disclosure.

As shown in FIG. 1, the lower body portion 30 can include the rear gate 32, a driver's side pillar 36a, a passenger side pillar 36b, and a bumper 37. The rear gate 32 can be rectangular so as to include an internal surface 29, an external surface 31, and a top edge 33 (FIG. 3). The internal surface 29 can face the cargo area or passenger compartment of the vehicle 10, and the external surface 31 can be opposite the internal surface 29. Moreover, the top edge 33 can be adjacent the window member 22 when the window member 22 is in the closed position (FIG. 3). The rear gate 32 can be pivotally attached to the passenger side pillar 36b via one or more hinges 34. In the embodiments illustrated, the hinges 34 are configured such that the rear gate 32 can pivot about a vertical axis of rotation that is substantially normal to the road surface. In additional embodiments, the rear gate 32 can be a flip-down gate that rotates about a horizontal axis that is substantially parallel to the road surface, or the rear gate 32 can otherwise move between closed and open positions. Also, the rear gate 32 can include a handle 35 on a side opposite the hinges 34, and the handle 35 can be grasped for manually opening and closing the rear gate 32.

Additionally, as shown in FIGS. 1 and 2, the upper cap portion 38 can include the roof 40 as well as a driver's side cap wall 42a and a passenger side cap wall 42b. The side cap walls 42a, 42b can extend downward normally from the roof 40 and can each include respective side windows 44 mounted thereto. In some embodiments, the side windows 44 can be fixed to the respective side cap walls 42a, 42b. In additional embodiments, the side windows 44 can be slidably, pivotally, or otherwise moveably attached to the respective side cap walls 42a, 42b for moving between open and closed positions.

Between the side cap walls 42a, 42b, the upper cap portion 38 can include a driver's side pillar 46a, a passenger side pillar 46b, and an eave 48, each of which extend downward from the roof 40 to partially define the rear wall 18 of the vehicle body 12. When the upper cap portion 38 is supported atop the lower body portion 30 (FIG. 1), the side pillar 46a can extend toward and abut the pillar 36a of the lower body portion 30, and the side pillar 46b can extend toward and abut the pillar 36b of the lower body portion 30. Thus, the opening 20 in the rear wall 18 of the vehicle body 12 can be defined between the pillars 36a, 46a, the eave 48, the pillars 36b, 46b, and the bumper 37. As stated above, the window member 22 and the rear gate 32 can cooperatively cover the opening 20 when both are closed.

Referring to FIGS. 1 and 2, the window member 22 will now be discussed in detail. The window member 22 can be generally rectangular and flat and can include an upper horizontal edge 50, a lower horizontal edge 52, a first vertical edge 54, and a second vertical edge 56. Also, the window member 22 can include an interior surface 58 and an exterior surface 60. The interior surface 58 can face the interior area (i.e., the passenger compartment, cargo area, etc.) of the vehicle 10 when the window member 22 is closed, and the exterior surface 60 can be opposite the interior surface 58 as shown in FIGS. 3 and 4.

Moreover, the window member 22 can be pivotally attached to the eave 48 via one or more hinges 62a, 62b. Thus, the window member 22 can pivot between its open and closed positions along a horizontal axis of rotation that is parallel to the road surface. However, it will be appreciated that the window member 22 could be attached to the vehicle body 12 to pivot about a vertical axis of rotation or other axis of rotation. Also, the window member 22 could be slideably or otherwise moveably attached to the vehicle body 12 without departing from the scope of the present disclosure.

Also, the window member 22 can generally include a substantially rectangular transparent plate 64 made from glass or transparent polymeric material. The transparent plate 64 can be at least partially framed by a framing member 66. The framing member 66 can be fixed to the plate 64. Also, the framing member 66 can extend continuously along the edges 50, 52, 54, 56, or the framing member 66 can extend along only some of the edges 50, 52, 54, 56. Also, the framing member 66 can be a monolithic part, or the framing member 66 can comprise a plurality of individual parts that are fixedly attached to the plate 64.

In the embodiments shown, the framing member 66 can include a lower horizontal portion 74. The lower horizontal portion 74 can be elongate and can be seen in cross section in FIGS. 3 and 4. As shown, the lower horizontal portion 74 can define a grooved portion 76 that receives the lower edge of the transparent plate 64. The lower horizontal portion 74 can also include a seal attachment area 78 that extends interiorly and downwardly from the grooved portion 76. The seal attachment area 78 can include a channel 80 that extends horizontally along the length of the exterior of the lower horizontal portion 74. A seal 82 can be sealingly received within the channel 80. The seal 82 can have a bulbous, hollow shape and can be made out of rubber or other polymer. The seal 82 can extend exteriorly from the seal attachment area 78 to also seal against the interior surface 29 of the rear gate 32 when the window member 22 and the rear gate 32 are both in the closed position. Thus, the seal can seal against both the window member 22 and the rear gate 32 to block water from entering the interior area (i.e., the passenger or cargo area) of the vehicle 10. Moreover, the lower horizontal portion 74 can include a projection 84 that projects downward from the seal attachment area 78. As shown in FIG. 2, the projection 84 can be flat and rectangular and can be substantially centered on the lower horizontal portion 74. When the window member 22 and rear gate 32 are in the closed position (FIG. 3), the projection 84 can be directly adjacent and substantially parallel to the interior surface 29 of the rear gate 32.

In the embodiments illustrated, the window member 22 can also include a handle 68 that is fixedly attached to the exterior of the lower horizontal portion 74 of the framing member 66. The handle 68 can include projections 70a, 70b that project exteriorly from respective ends of the lower horizontal portion 74. The handle 68 can further include an elongate bar 72 that extends between the projections 70a, 70b. As shown in FIG. 1, the projections 70a, 70b and bar 72 of the handle 68 can be disposed above the rear gate 32. Thus, the user can grasp one of the projections 70a, 70b or the bar 72 to manually move and rotate the window member 22 between its open and closed positions.

Referring to FIGS. 1 and 2, the defogger 26 will be discussed in greater detail. The defogger 26 can include a grid portion 101 that comprises a plurality of resistive electrical wires that are silkscreened or otherwise supported to the interior surface 58 of the transparent plate 64 of the window member 22. The defogger 26 can also include electrically conductive leads 102a, 102b that extend downward from the grid portion 101. In the embodiments shown, the leads 102a, 102b extend from the grid portion 101 toward the lower horizontal edge 52 of the window member 22. It will be appreciated that the leads 102a, 102b can have opposite polarities (i.e., positive and ground). Each of the leads 102a, 102b can terminate in respective first conductive pads 104, one of which is shown in FIG. 3. The conductive pads 104 can be disposed directly adjacent the grooved portion 76 of the lower horizontal portion 74 of the framing member 66.

The defogger 26 can further include second conductive pads 106 (i.e., a positive and ground). One of the second conductive pads 106 is shown in FIG. 3. The second conductive pads 106 can face and abut respective ones of the first conductive pads 104 to electrically connect thereto. A conductive line 108 can be electrically connected to and can extend from each second conductive pad 106. The conductive line 108 can extend through the lower horizontal portion 76 of the framing member 66 and can terminate at respective second terminals 110a, 110b. The second terminals 110a, 110b can be disposed on the exterior surface of the projection 84 of the lower horizontal portion 74 of the framing member 66 as shown in FIGS. 2 and 3).

Thus, the defogger 26 can include a portion that is mounted directly to the transparent plate 64 (i.e., the grid portion 101, the leads 102a, 102b and the first conductive pads 104) and another portion that is supported directly by the framing member 66 (i.e., the second conductive pads 106, the lines 108, and the second terminals 110a, 110b). It will be appreciated that the second conductive pads 106, the conductive lines 108, and the second terminals 110a, 110b can be mounted and attached to the lower horizontal portion 74 of the framing member 66 in any suitable fashion. For instance, the second conductive pads 106, conductive lines 108, and second terminals 110a, 110b can be insert molded on the lower horizontal portion 74 in some embodiments. The wiring for the defogger 26 can also be routed through and supported by any other suitable portion of the window member 22.

Referring now to FIGS. 3 and 4, the wiring system 86 will now be discussed in detail. For purposes of discussion, the wiring system 86 will be described as electrically connecting the power source 88 to the rear defogger 26; however, it will be appreciated that the wiring system 86 could be configured to electrically connect the power source 88 to the electric wiper 28 or other electrical device 24a, 24b without departing from the scope of the present disclosure. It will be assumed that the wiring system 86 is a DC circuit; however, it will be appreciated that the wiring system 86 could be an AC circuit. Moreover, for the sake of simplicity, only the positive polarity portion of the wiring system 86 will be discussed in detail, and it will be assumed that the negative polarity (ground) portion of the wiring system 86 could be similarly routed through the vehicle 10 between the power source 88 and the rear defogger 26.

The wiring system 86 can extend through the vehicle body 12 to electrically connect the defogger 26 to a power source 88 (FIGS. 3 and 4). The wiring system 86 can include a series of wires or other electrically conductive members that defines an electrical path between the power source 88 and the defogger 26. In some embodiments, the power source 88 is a battery, such as the main vehicle battery that powers other vehicle systems; however, the power source 88 can be a source dedicated only to defogger 26. The power source 88 can also be a solar cell, a capacitor, or other type of power source.

As shown in FIG. 3, the wiring system 86 can include an electrical line 90 (e.g., a conductive wire with positive polarity) that extends from the positive terminal of the power source 88, through the vehicle body 12 and that terminates at a first terminal 92. In the embodiments shown, the first terminal 92 is located internally within the rear gate 32.

When the window member 22 is adjacent the rear gate 32 (i.e., a "first position" in which the cap portion 38 is supported atop the vehicle body 12 and the window member 22 and rear gate 32 are both in the closed position (FIG. 3)), the first and second terminals 92, 110 can be directly adjacent each other. The passive electrical connector(s) 94 can electrically connect the first and second terminals 92, 110 to close the electrical path between the power source 88 and the defogger 26.

In the embodiments shown, the passive electrical connector 94 includes a mount 96, a plunger 98, and a biasing member 100. The mount 96 can be annular, can be made from electrically conductive material, and can be fixed to the rear gate 32. The mount 96 can be electrically connected to the first terminal 92 of the line 90. The plunger 98 can be rod-shaped and bulbous at each end and can include an electrically conductive portion 97 and an electrically insulative portion 99. As shown in FIGS. 3 and 4, the conductive portion 97 can be included on the interior end of the plunger 98, and the insulative portion 99 can be included on the exterior end. In some embodiments, the plunger 98 can be made from an insulative polymer and the conductive portion 97 can be an electrically conductive material that is coated to the end of the plunger 98. In other embodiments, the conductive and insulative portions 97, 99 can be joined via adhesives, welding, etc. The plunger 98 can be slidingly received within the mount 96. The biasing member 100 can be a helical compression spring that is made out of an electrically insulative material. The biasing member 100 can be disposed between the mount 96 and the conductive portion 97 of the plunger 98.

Thus, the biasing member 100 can bias the plunger 98 toward an extended position (FIG. 4), wherein the plunger 98 extends interiorly relative to the mount 96. Also, the plunger 98 can be moved (i.e., pushed) against the force of the biasing member 100 toward a retracted position (FIG. 3). In the retracted position (FIG. 3), the conductive portion 97 of the plunger 98 can be in electrical connection with the mount 96, and in the extended position (FIG. 4), the conductive portion 97 can be spaced apart from the mount 96 so as to be electrically disconnected.

Accordingly, when the upper cap portion 38 is supported atop the lower body portion 30 and the rear gate 32 and window member 22 are in the respective closed position (FIG. 3), the second terminals 110 can abut against the conductive portion 97 of the respective plunger 98 to move the plunger 98 toward its retracted position. As such, the defogger 26 can be electrically connected to the power source 88. Specifically, assuming that the defogger 26 is turned ON, there is a closed electrical path from the power source 88, through the line 90, through the mount 96, through the conductive portion 97 of the plunger 98, through the line 108, through the lead 102a, through the grid portion 101, and back to the power source 88 through the lead 102b, through the opposite polarity lead 108, plunger 98, mount 96, and line 90. It will be appreciated that the wiring system 86 can also include a switch (not shown) that the user can use to turn the defogger 26 OFF selectively.

If the window member 22 is disposed away from the rear gate 32 (FIG. 4) (e.g., by opening the rear gate 32, by opening the window member 22, or by removing the upper cap portion 38 from the lower body portion 30), then the defogger 26 will be electrically disconnected from the power source 88. Specifically, the second terminals 110a, 110b can move away from the conductive portion 97 of the plungers 98 to cause the disconnection. Also, the biasing members 100 can bias the plunger 98 toward its extended position to electrically disconnect the conductive portion 97 of the plunger 98 and the mount 96. Thus, because the plunger 98 is disconnected, the plunger 98 is unlikely to inadvertently shock a person that touches the plunger 98.

When the window member 22 is moved back to the position of FIG. 3 (e.g., by supporting the upper cap portion 38 on the lower body portion 30 and closing the rear gate 32 and window member 22) the passive electrical connector 94 can automatically and conveniently electrically re-connect the defogger 22 to the power source 88. Also, because the biasing member 100 biases the plunger 98 toward the second terminals 110a, 110b, this electrical connection can be ensured during vehicle travel, etc.

Accordingly, the passive electrical connector 94 can conveniently and automatically connect and disconnect the defogger 26 or other electrical device 24a, 24b to/from the power source 88. Thus, even though the window member 22 is moveable between open and closed positions, the rear gate 32 is moveable between open and closed positions, and/or the upper cap portion 38 is removable from the lower body portion 30, the defogger 26 can be conveniently and accurately connected and disconnected to/from the power source 88.

The vehicle 10 could be configured differently without departing from the scope of the present disclosure. For instance, the passive electrical connector 94 could be mounted to the projection 84 or other portion of the window member 22, and the plunger 98 could be configured to abut and electrically connect to the terminal 92 of the rear gate 32 in some embodiments. Also, as mentioned the rear wall 18 of the vehicle body 12 could be fixed (instead of including the pivotable rear gate 32) while the window member 22 is moveable (e.g., openable and closeable) relative to the vehicle body 12. Moreover, the rear gate 32 and the window member 22 could be fixed relative to each other and could be collectively moveable (e.g., pivotable) relative to the side walls 16a, 16b of the vehicle body 12. Also, the electrical device(s) 24a, 24b could be mounted to other window members 22 of the vehicle 10 instead of the rear window of the vehicle 10.

What is claimed is:

1. A vehicle comprising:
a vehicle body that at least partially defines an interior area of the vehicle, the vehicle body operably supporting an electrical line that is electrically connected to a power source and that terminates at a first terminal;
a window member, the window member having a transparent plate and a framing member that is fixed to an edge of the transparent plate, the framing member having a lower portion extending below a bottom edge of the transparent plate,
a grid portion comprising a plurality resistive wires the grid portion having a portion that is mounted to the transparent plate and another portion that is supported by the framing member on an inner side of the lower portion of the framing member, a second terminal operably supported on the inner side of the lower portion of the framing member, an electrically conductive line that extends from the grid portion to the second terminal, the window member being moveable relative to the vehicle body to move between a first position, in which the second terminal is electrically connected to the first terminal, and a second position, in which the second terminal is electrically disconnected from the first terminal; and
a passive electrical connector with a mount fixed to the vehicle body and a plunger that moves in the mount between a retracted position and an extended position, the mount electrically connected to the first terminal, the passive electrical connector also including a biasing member that biases the plunger toward the extended position, the plunger of the passive electrical connector electrically contacting the second terminal and electrically contacting the mount to electrically connect the first and second terminals when the window member is in the first position, the second terminal spaced from the plunger when the window member is in the second position electrically disconnecting the first and second terminals, the plunger electrically disconnected from the mount when in the extended position.

2. The vehicle of claim 1, wherein the electrically conductive line includes a first portion that extends across the transparent plate and a second portion that extends across the framing member.

3. The vehicle of claim 2, wherein the first portion of the electrically conductive line includes a first conductive pad that is supported on a first surface of the transparent plate, wherein the second portion of the electrically conductive line includes a second conductive pad that is supported on a second surface of the framing member, the second surface facing the first surface, the first and second conductive pads being fixed relative to each other and electrically connected to each other.

4. The vehicle of claim 2, further comprising a sealing member that is operable to seal against both the framing member and the vehicle body.

5. The vehicle of claim 4, wherein the framing member includes an attachment area for fixedly attaching the sealing member to the framing member, the sealing member operable to extend from the attachment area toward the vehicle body to seal against the vehicle body.

6. The vehicle of claim 1, wherein the vehicle body includes a lower body portion and a cap portion, the cap portion being removably supported on the lower body portion, the window member in the first position when the cap portion is supported on the lower body portion, the window member in the second position when the cap portion is removed from the lower body portion.

7. The vehicle of claim 1, wherein the window member is rotatably coupled to the vehicle body to move between the first position and the second position.

8. The vehicle of claim 7, wherein the window member includes an upper substantially horizontal edge and a lower substantially horizontal edge, further comprising a pivot coupling that is fixed to the window member adjacent the upper substantially horizontal edge to the vehicle body, and wherein the second terminal is supported adjacent the lower substantially horizontal edge.

9. The vehicle of claim 1, wherein the vehicle body includes a lower body portion and a cap portion, the cap portion being removably supported on the lower body portion, the window member being rotatably coupled to the cap portion to move between a closed position and an open position relative to the cap portion, the window member being in the first position when the window member is in the closed position and the cap portion is supported on the lower body portion, the window member being in the second position when either the cap portion is removed from the lower body portion or the window member is in the open position.

10. The vehicle of claim 1, wherein the vehicle body includes a rear wall with a gate that is pivotally coupled to a surrounding portion of the rear wall to move between an open position and a closed position, the window member being in the first position when the gate is in the closed position, the window member being in the second position when the gate is in the open position.

11. The vehicle of claim 1, wherein the vehicle body defines a side wall of the vehicle and a rear wall of the vehicle, and wherein the window member defines a rear window of the vehicle that is operably supported by the rear wall of the vehicle.

12. The vehicle of claim 1, wherein the vehicle body includes a rear wall with a gate that is pivotally coupled to a surrounding portion of the rear wall to move between an open position and a closed position, the window member being in the first position when the gate is in the closed position, the window member being in the second position when the gate is in the open position, the mount of the passive electrical connector fixed to the gate.

13. A vehicle comprising:
a vehicle body that at least partially defines an interior area of the vehicle, the vehicle body operably supporting an electrical line that is electrically connected to a power source and that terminates at a first terminal;
a rear window member with a transparent plate and a framing member that frames the transparent plate, the framing member having a lower portion extending blow a bottom edge of the transparent plate, the rear window member being moveable relative to the vehicle body to move between a first position and a second position;
a defogger that is operably mounted to the rear window member, the defogger including an electrical line that extends across the transparent pane and the framing member and that terminates at a second terminal supported on an inner side of the lower portion of the framing member; and
a passive electrical connector with a mount fixed to the vehicle body and a plunger that moves between a retracted position and an extended position, the mount electrically connected to the first terminal, the passive electrical connector also including a biasing member that biases the plunger toward the extended position, the plunger of the passive electrical connector electrically contacting the second terminal and electrically contacting the mount to electrically connect the first and second terminals when the window member is in the first position, the second terminal spaced from the plunger when the window member is in the second position electrically disconnecting the first and second terminals, the plunger electrically disconnected from the mount when in the extended position.

14. The vehicle of claim 13, further comprising a sealing member that is operable to seal against both the framing member and the vehicle body.

15. The vehicle of claim 14, wherein the framing member includes an attachment area for fixedly attaching the sealing member to the framing member, the sealing member operable to extend from the attachment area toward the vehicle body to seal against the vehicle body.

16. The vehicle of claim 13, wherein the vehicle body includes a lower body portion and a cap portion, the cap portion being removably supported on the lower body portion, the window member being in the first position when the cap portion is supported on the lower body portion, the window member being in the second position when the cap portion is removed from the lower body portion.

17. The vehicle of claim 13, wherein the vehicle body includes a lower body portion and a cap portion, the cap portion being removably supported on the lower body portion, the window member being rotatably coupled to the cap portion to move between a closed position and an open position relative to the cap portion, the window member being in the first position when the window member is in the closed position and the cap portion is supported on the lower body portion, the window member being in the second position when either the cap portion is removed from the lower body portion or the window member is in the open position.

* * * * *